US011993451B2

(12) United States Patent
Carman

(10) Patent No.: US 11,993,451 B2
(45) Date of Patent: May 28, 2024

(54) BULK BIN, BULK BIN SLEEVE PACK, AND RELATED METHOD

(71) Applicant: Inteplast Group Corporation, Livingston, NJ (US)

(72) Inventor: Gregory A. Carman, Victoria, TX (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 861 days.

(21) Appl. No.: 16/943,237

(22) Filed: Jul. 30, 2020

(65) Prior Publication Data

US 2022/0033175 A1 Feb. 3, 2022

(51) Int. Cl.

| | |
|---|---|
| ***B65D 88/52*** | (2006.01) |
| ***B31B 50/26*** | (2017.01) |
| ***B31B 50/73*** | (2017.01) |
| *B31B 110/35* | (2017.01) |
| *B31B 120/10* | (2017.01) |
| *B31B 120/30* | (2017.01) |

(52) U.S. Cl.

CPC .............. *B65D 88/52* (2013.01); *B31B 50/26* (2017.08); *B31B 50/734* (2017.08); *B31B 2110/35* (2017.08); *B31B 2120/10* (2017.08); *B31B 2120/302* (2017.08)

(58) Field of Classification Search

CPC .......... B65D 88/52; B65D 5/68; B65D 5/324; B65D 11/1866; B65D 11/18; B65D 11/188; B65D 19/06

See application file for complete search history.

(56) References Cited

U.S. PATENT DOCUMENTS

| | | | | |
|---|---|---|---|---|
| 460,646 A | | 10/1891 | Merrill | |
| 697,668 A | | 4/1902 | Schleicher | |
| 2,167,917 A | | 8/1939 | Vogt | |
| 2,709,547 A | * | 5/1955 | Niedringhaus | B65D 19/02 108/55.3 |
| 2,799,458 A | | 7/1957 | Nye | |
| 3,034,697 A | | 5/1962 | Frankenstein | |

(Continued)

FOREIGN PATENT DOCUMENTS

| | | |
|---|---|---|
| CA | 2047652 | 1/1993 |
| DE | 3703018 A1 | 8/1987 |

(Continued)

*Primary Examiner* — Don M Anderson

(74) *Attorney, Agent, or Firm* — Stinson LLP

(57) ABSTRACT

A bulk bin sleeve pack is repeatably erected to form a bulk bin having a bottom wall and a perimeter wall and collapsed when not in use. The bulk bin sleeve pack includes a base that forms the bottom wall of the bulk bin. First and second wall members form the perimeter wall and are attached to one another and the base. The first and second wall members overlap a portion of the base. Locking tabs are associated with at least one of the base and the first and second wall members. Locking openings are associated with at least one of the base and the first and second wall members. The locking openings oppose the locking tabs when the first and second wall members are attached to the base to form the perimeter wall of the bulk bin. The locking tabs are lockingly inserted into the locking openings to secure the first and second wall members to the base to form the bulk bin.

14 Claims, 6 Drawing Sheets

(56) References Cited

U.S. PATENT DOCUMENTS

| | | | |
|---|---|---|---|
| 3,058,775 A | 10/1962 | Schliephacke | |
| 3,525,466 A | 8/1970 | Robinson | |
| 3,791,002 A | 2/1974 | Lampe et al. | |
| 3,869,079 A | 3/1975 | Oglesbee | |
| 3,876,073 A | 4/1975 | Herbetko | |
| 4,017,019 A * | 4/1977 | Booth | B65D 5/46104 229/113 |
| 4,085,847 A | 4/1978 | Jacalone | |
| 4,089,417 A | 5/1978 | Osborne | |
| 4,105,153 A | 8/1978 | Locke | |
| 4,119,266 A | 10/1978 | Dempster | |
| 4,131,228 A | 12/1978 | Barry | |
| 4,386,729 A | 6/1983 | Schmidt | |
| 4,441,649 A | 4/1984 | Nederveld | |
| 4,454,946 A | 6/1984 | Yokowo | |
| 4,561,587 A | 12/1985 | Wysocki | |
| 4,830,270 A | 5/1989 | Holmes | |
| 4,883,221 A | 11/1989 | Brundage | |
| 5,000,372 A | 3/1991 | Hollander et al. | |
| 5,150,646 A | 9/1992 | Lomczak | |
| 5,163,609 A | 11/1992 | Muise, Jr. | |
| 5,467,916 A | 11/1995 | Beales | |
| 5,485,951 A | 1/1996 | Phillips | |
| 5,509,620 A | 4/1996 | Crews | |
| 5,597,084 A | 1/1997 | Parasin | |
| 5,735,483 A | 4/1998 | Bierlein | |
| 5,743,422 A | 4/1998 | Hale | |
| 5,791,590 A | 8/1998 | Zuk et al. | |
| 6,364,200 B1 | 4/2002 | Moss et al. | |
| 6,371,363 B1 | 4/2002 | Franklin et al. | |
| 6,386,437 B1 | 5/2002 | Larson, Jr. | |
| 6,575,398 B2 | 6/2003 | Nakamura et al. | |
| 6,688,514 B2 | 2/2004 | Evans et al. | |
| 7,278,565 B2 | 10/2007 | West | |
| 7,467,743 B1 | 12/2008 | Philips | |
| 7,654,440 B2 | 2/2010 | Quaintance et al. | |
| 8,091,770 B2 | 1/2012 | McLeod | |
| 8,205,787 B2 | 6/2012 | Panduro, Jr. et al. | |
| 9,213,367 B1 | 12/2015 | Nelson et al. | |
| 9,290,290 B2 | 3/2016 | Carman | |
| 9,556,000 B2 | 1/2017 | Carman | |
| 10,526,106 B2 * | 1/2020 | Carman | B31B 50/00 |
| 2017/0029163 A1 | 2/2017 | Olds et al. | |
| 2018/0186508 A1 * | 7/2018 | Carman | B65D 5/321 |

FOREIGN PATENT DOCUMENTS

| | | |
|---|---|---|
| DE | 29502721 U1 | 8/1995 |
| EP | 2565140 A1 | 3/2013 |
| EP | 2634127 A1 | 9/2013 |
| GB | 2165214 A | 4/1986 |

* cited by examiner

BULK BIN, BULK BIN SLEEVE PACK, AND RELATED METHOD

FIELD

The present disclosure generally relates to bulk bins and more particularly to a sleeve pack configured to be selectively erected as a bulk bin and selectively collapsed for storage when in disuse.

BACKGROUND

Bulk bins, which are sometimes referred to as bulk boxes, Gaylord bins, skid boxes, pallet boxes, octabins, etc., are commonly used for storing and shipping bulk quantities of goods. Typically, bulk bins are erected on pallets so that a forklift can move a bin while it is filled with goods. In an erected configuration, a bulk bin defines a large interior volume for receiving and containing goods in bulk. Some bulk bins are selectively collapsible for storing the bulk bin in a more space-efficient manner when it is not being used.

Certain bulk bins are formed from sleeve packs. Bulk bin sleeve packs typically include a base and two separate wall members that are arranged to form a perimeter wall of the bulk bin. The two wall members can be secured to one another to form the perimeter wall. The perimeter wall rests on the base with no attachment of the perimeter wall to the base.

SUMMARY

In one aspect, a bulk bin sleeve pack for being repeatably erected to form a bulk bin having a bottom wall and a perimeter wall and collapsed when not in use comprises a base configured to form the bottom wall of the bulk bin. A first wall member is configured to form a portion of the perimeter wall of the bulk bin. The first wall member has a bottom edge margin, a top edge margin, and first and second side margins. The bottom edge margin is configured for attachment to the base so that the first wall member overlaps at least a portion of the base. A second wall member is configured to form another portion of the perimeter wall of the bulk bin. The second wall member has a bottom edge margin, a top edge margin, and first and second side margins. The bottom edge margin of the second wall member is configured for attachment to the base so that the first side margin of the first wall member overlaps the second side margin of the second wall member, the second side margin of the first wall member overlaps the first side margin of the second wall member, and the second wall member overlaps at least a portion of the base. Locking tabs are associated with at least one of the base and the first and second wall members. Locking openings are associated with at least one of the base and the first and second wall members. The locking openings oppose the locking tabs when the first and second wall members are attached to the base to form the perimeter wall of the bulk bin. The locking tabs are configured to be lockingly inserted into the locking openings to secure the first and second wall members to the base to form the bulk bin.

In another aspect, a bulk bin comprises a base having a perimeter. A perimeter wall extends circumferentially around a bulk bin interior and has a top edge margin and an opposite bottom edge margin arranged adjacent the perimeter of the base such that the base defines a bottom end of the bulk bin interior. An interlocking connection secures the base and the perimeter wall together. The interlocking connection includes at least one opening formed in either the base or the perimeter wall and at least one locking tab extending from the other of the base or the perimeter wall with the at least one locking tab extending through one of the at least one opening and locking the base and perimeter wall together.

In another aspect, a method of making a bulk bin sleeve pack comprises forming from a blank a perimeter wall member having an opening adjacent to a bottom edge margin of the perimeter wall member and forming from a blank a base having a perimeter. The base includes a locking tab and the perimeter wall member is sized and shaped for attachment to the base to form a perimeter wall on the base so that the opening of the perimeter wall member is aligned with the locking tab of the base.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
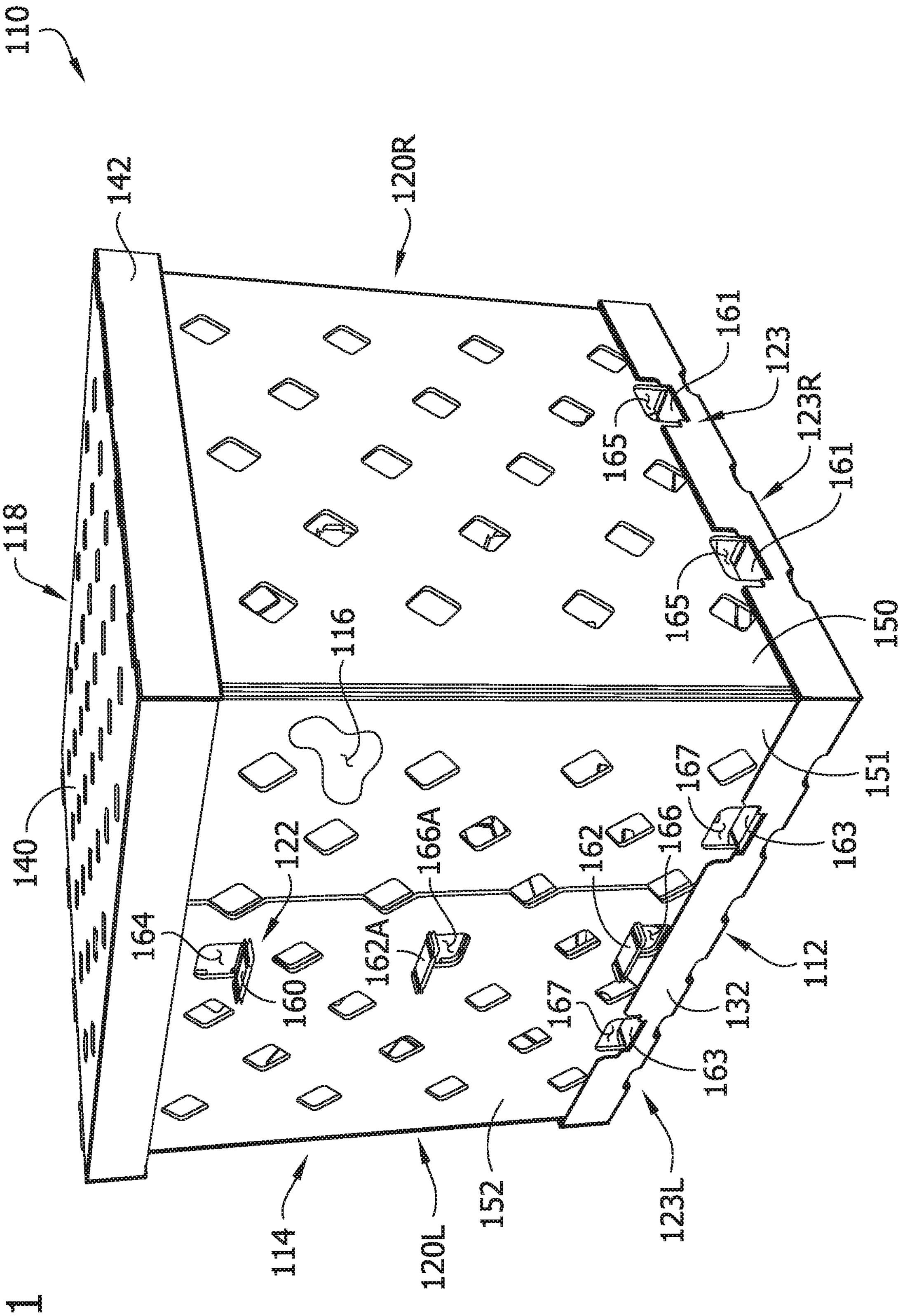
FIG. 1 is a perspective of a bulk bin sleeve pack according to another embodiment of the present disclosure in an erected configuration with a portion of a perimeter wall broken away to reveal a bulk bin interior.
Figure 2:
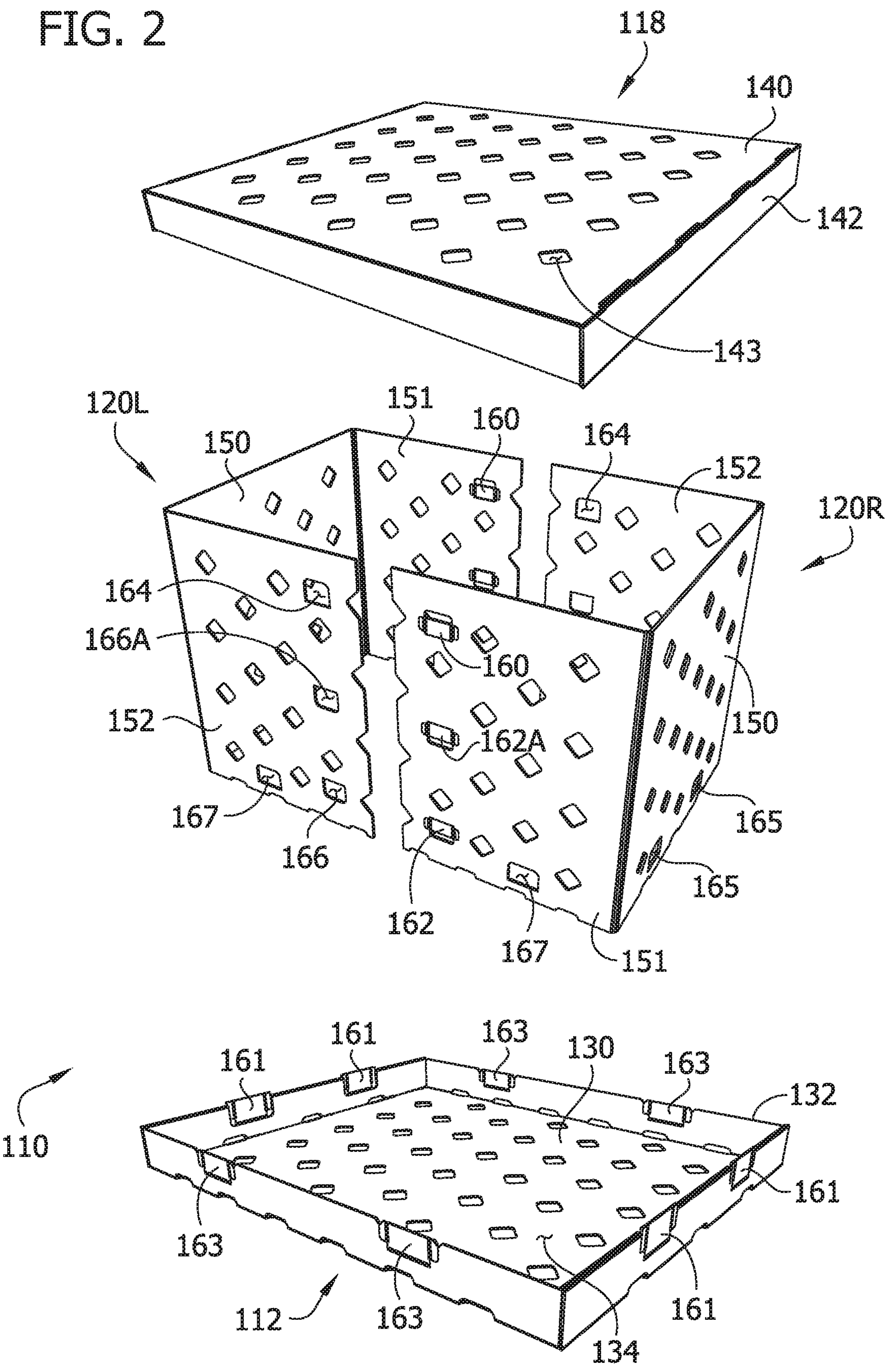
FIG. 2 is an exploded perspective of the bulk bin sleeve pack.

Referring to FIGS. 1 and 2, a bulk bin sleeve pack according to one embodiment of the present disclosure is generally indicated at reference number 110. The bulk bin sleeve pack 110 is shown in an erected configuration in FIG. 1. The erected bulk bin 110 includes a bottom tray (broadly, a base), generally indicated at 112, which forms the floor or bottom end of the bulk bin. The erected bulk bin 110 also includes a perimeter wall assembly (e.g., a perimeter wall), generally indicated at 114, which extends circumferentially around a bulk bin interior 116, and a top tray, generally indicated at 118, placed over the bulk bin interior to form a lid or top end of the bulk bin. The perimeter wall assembly 114 comprises left and right wall members 120L, 120R. Throughout this disclosure, terms such as front, back, left, and right refer to the orientation of various features of the sleeve pack as shown in FIG. 1, and the signifiers F, B, L, R are appended to the reference numbers of certain features that are positioned toward the front, back, left, and right, respectively, of the bulk bin 110 as shown in FIG. 1. It is understood that the orientation and position of these features will vary in use. As explained in further detail below, the wall members 120L, 120R are formed form separate blanks that define mating interlocking formations configured to form first and second interlocking connections, the first of which is generally indicated at 122 and the second of which is blocked from view by the perimeter wall assembly 114. A strap (not shown) can also be secured about the perimeter wall assembly 114 to further gird the perimeter wall assembly against lateral loads imparted on the bulk bin 110 in use. Below, each of components of the sleeve pack 110 is described in detail before describing the use of the sleeve pack, including its deployment and storage.

Figure 4:
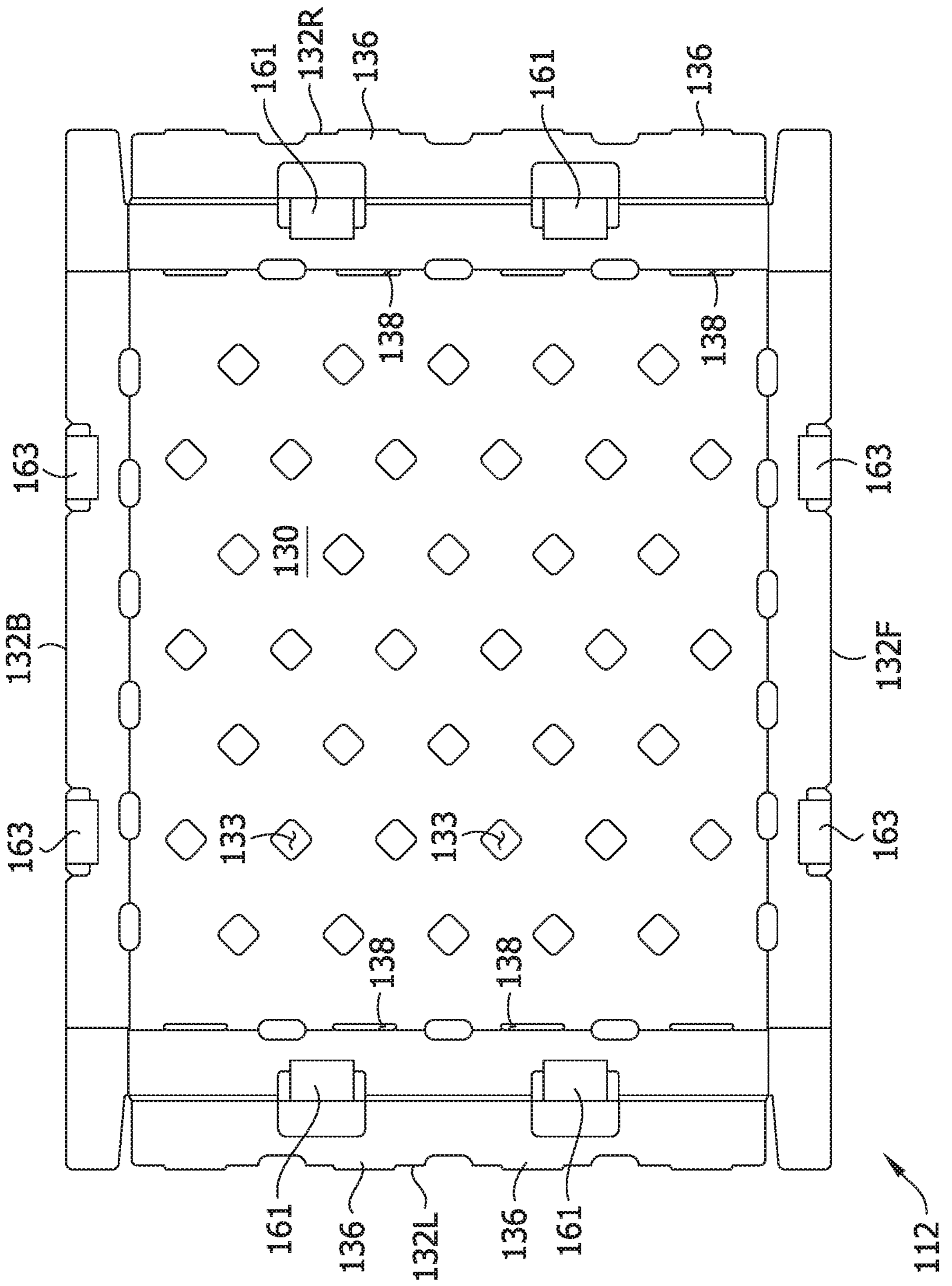
FIG. 4 is a plan view of a bottom tray blank of the bulk bin sleeve pack.

Referring to FIGS. 2 and 4, the bottom tray 112 is assembled from a blank (FIG. 4) to form a tray (FIG. 2) comprising a bottom panel 130 and a rim 132 extending upward from the bottom panel. Holes 133 are formed in the bottom panel 130 to allow fluid flow (e.g., air or water flow) into and out of the bulk bin interior 116 through the bottom end of the bulk bin 110. The rim 132 defines a perimeter of the bottom tray 112 and extends circumferentially around a storage cavity 134 that is shaped and arranged for receiving the collapsed left and right wall members 120L, 120R in the collapsed configuration. In the erected configuration, a bottom edge margin of the perimeter wall assembly 114 is arranged adjacent the perimeter of the bottom tray such that the bottom panel 130 defines a bottom boundary of the bulk bin interior 116. More specifically, in the illustrated embodiment, the bottom edge margin of the perimeter wall assembly 114 nests inside in the storage cavity 134.

As mentioned above, the bottom tray 112 is formed from a blank as shown in FIG. 4. The bottom tray blank 112 comprises a single board that is stamped or otherwise formed to define the bottom panel 130 and a plurality of rim (e.g., side) panels 132F, 132B, 132L, 132R that are foldably connected to the bottom panel to form the rim 132. In one or more embodiments, the bottom tray is formed from a single board of fluted plastic material, but other materials may also be used without departing from the scope of the invention. For example, in certain embodiments one or more components of the sleeve pack can be formed from a polymer bubble board such as the materials disclosed in U.S. Design Pat. Nos. D771,841 and D772,437, which are hereby incorporated by reference in their entireties. The rim panels include a left rim panel 132L for forming a left end of the rim 132, a right rim panel 132R for forming a right end of the rim, a front rim panel 132F for forming a front side of the rim, and a back rim panel 132B for forming the back side of the rim. To assemble the bottom tray 112 from the blank, the front and back rim panels 132F, 132B are folded up from the bottom panel 130 along respective fold lines, and left and right corner portions of each are folded inward until they are generally aligned with left and right edges of the bottom panel. The left and right end panels 132L, 132R are subsequently folded up along fold lines defining the left and right edges of the bottom panel 130 and inward along additional fold lines over the left and right corner portions of the front and back rim panels 132F, 132B. Protrusions 36 projecting from the left and right end panels 32L, 32R are received in corresponding slots 138 formed along the end edges of the bottom panel 130 to secure the panels in position to form the rim 132.

Referring to FIG. 2, the top tray 118 is constructed similar to the bottom tray 112 to form a lid or cover that can be selectively placed over the bulk bin interior 16 in the erected configuration or placed over the storage cavity 134 in a collapsed configuration (not shown). Like the bottom tray 112, the top tray 118 is assembled from a blank to form a tray comprising a top panel 140 and a rim 142 extending downward from the top panel. In the illustrated embodiment, the top panel 140 of the top tray 118 is slightly larger than the bottom panel 130 of the bottom tray 112 so that the bottom tray and wall panels 120L, 120R can be received within the top tray in the collapsed configuration. When the top tray 118 is installed as a cover over the open top end of the bulk bin 110 in the erected configuration, a top edge margin of the perimeter wall assembly 114 is arranged adjacent the perimeter of the top tray such that the top panel 140 defines a top boundary of the bulk bin interior 116. More specifically, the top edge margin of the perimeter wall assembly 114 nests inside the rim 142 with no fixed connection between the top tray 112 and the perimeter wall assembly. Accordingly, the top tray 118 can be quickly installed and removed as a cover or lid over the open top end of the bulk bin 110 in use. And when the top tray 118 is installed, holes 143 formed in the top panel 140 allow fluid flow into and out of the bulk bin interior 116 through the top of the bulk bin 110. It will be understood that in other embodiments, a sleeve pack can include another type of top member or cover or be free of a cover without departing from the scope of the invention. Moreover, a bulk bin may not be collapsible as described herein and remain within the scope of the present invention.

Figure 3:
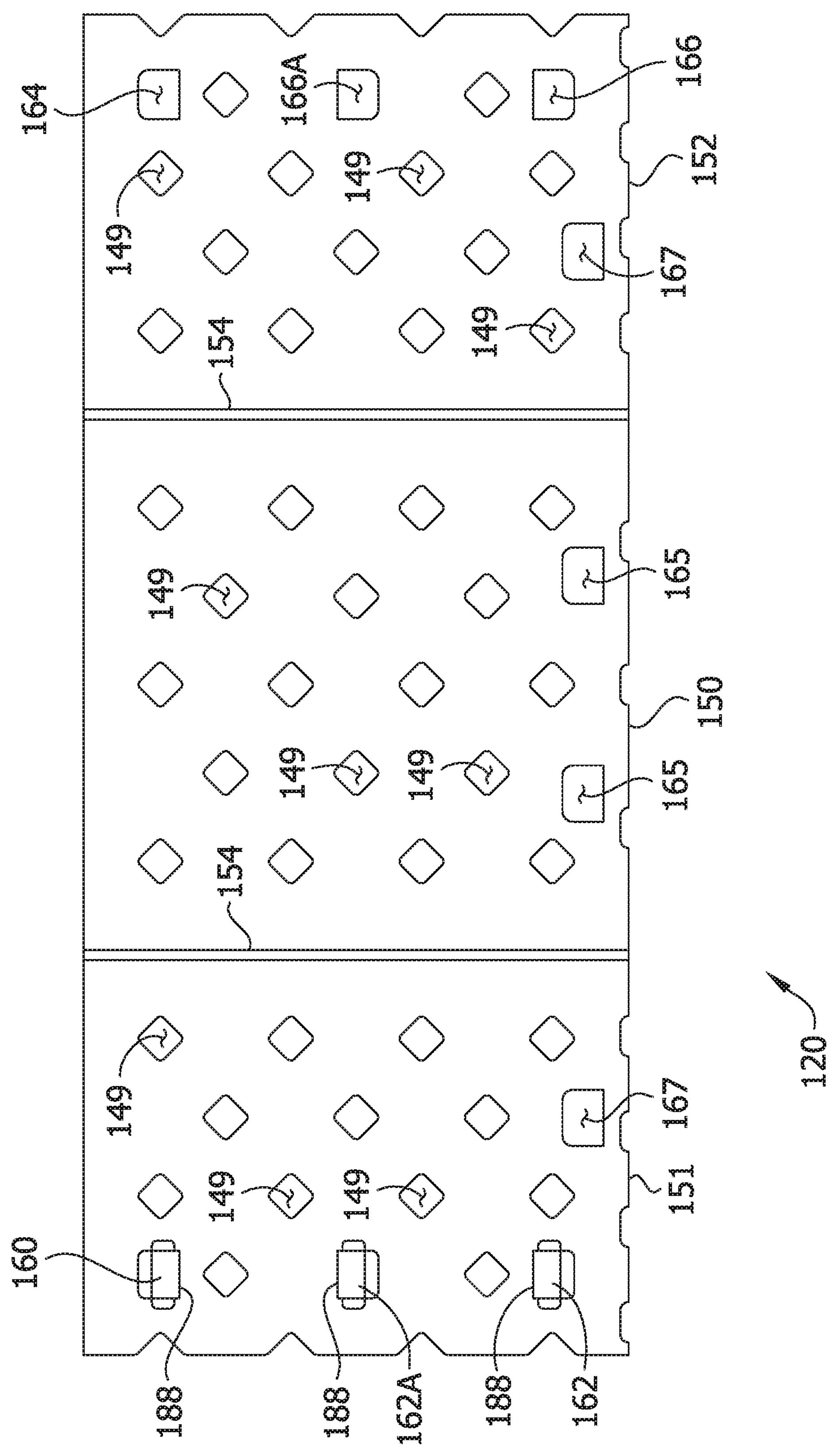
FIG. 3 is a plan view of a wall member blank of the bulk bin sleeve pack.

Referring to FIGS. 2 and 3, the left and right wall members 120L, 120R are formed form two identical wall member blanks 120 (FIG. 3) that are folded so that each forms a generally rectilinear U-shape when viewed from the top or bottom end of the bulk bin 110 in the erected configuration. The two identical blanks 120 are folded in opposite orientations to form the erected left and right wall members 120L, 120R. The features of the blank 120 shown in FIG. 3 and discussed in further detail below are common to both the left wall member 120L and the right wall member 120R. Although the illustrated embodiment uses identical blanks to form the left and right wall members 120L, 120R, it will be understood that in other embodiments, the wall members could be formed from blanks of different constructions without departing from the scope of the invention.

Referring to FIG. 3, each wall member blank 20 is suitably formed of a single board having a top edge margin, a bottom edge margin, and a height extending therebetween. In one or more embodiments, the board that forms the blank 20 comprises a fluted plastic material, but other materials may also be used without departing from the scope of the invention. In the illustrated embodiment, a plurality of fluid flow holes 149 extend through the thickness of the blank 120 to promote fluid flow through the bulk bin interior 116 when the bulk bin sleeve pack 110 is erected.

The blank 120 includes a central panel 150 and first and second end panels 151, 152 are hingedly connected to the sides of the central panel. In one or more embodiments, living hinges are established along fold lines 154 formed in the blank 120 at the junctures between the central panel 150 and the first and second side panels 151, 152. The fold lines 154 can be formed in a suitable manner such as by heat scoring the fluted plastic material along the fold lines or by using a crease-forming machine, such as the Wegener Welding Crease-Folding Machine Model ESP 2000, available from Wegener Welding LLC in Burr Ridge, Illinois Suitably, the blank 120 is sufficiently flexible along the fold lines 154 to permit the left and right side wall members 120L, 120R to be folded in a substantially flat, three-layer configuration for storage. For example, in an exemplary collapsed configuration, the first side panel 151 is folded under the central panel 150 and the second side panel 152 is folded over the central panel so that the three panels are arranged adjacent one another and extend in substantially parallel planes. The first side panel 151 defines a first side margin of the blank 120 and the second side panel 152 defines a second side margin of the blank. As explained in further detail below, locking formations are formed in the first and second panels 151, 152 for forming interlocking connections 122 that, in the erected configuration, secure the first side margin of the left wall member 120L in overlapping engagement with the second side margin of the right wall member 120R and the second side margin of the left wall member in overlapping engagement with the first side margin of the right wall member.

The illustrated wall member blank 120 includes an upper locking tab 160, a lower locking tab 162 and an intermediate locking tab 162A that are formed in the first side panel 151 at spaced apart locations along the height of the first side margin of the blank. The second side panel 152 defines an upper opening 164, a lower opening 166 and an intermediate opening 166A at spaced apart locations along the height of the second side margin of the blank that are generally aligned with the upper locking tab 160, the lower locking tab 162 and the intermediate locking tab 162A along the height of the blank 120. The upper tab 160 and the upper opening 164 are each located adjacent the top edge margin of the blank and the lower locking tab 162 and the lower opening 166 are each located adjacent the bottom edge margin of the blank. Similarly, the intermediate tab 162A and intermediate opening 166A are located between the top and bottom edge margins, generally at about mid-height of the blank 120 in the illustrated embodiment. When the bulk bin 10 is erected as shown in FIG. 1, the locking tabs 160, 162, 162A of the right wall panel 120R are configured to be lockingly pushed through the openings 164, 166, 166A of the left wall panel 120L to form the front interlocking connection 122 between the first side margin of the right wall panel and the second side margin of the left wall panel. Likewise, the locking tabs 160, 162, 162A of the left wall panel 120L are configured to be lockingly pushed through the openings 164, 166, 166A of the right wall panel 120R to form the back interlocking connection 122 (not shown) between the first side margin of the left wall panel and the second side margin of the right wall panel.

Although the illustrated wall blank 120 uses upper, lower and intermediate locking tabs 160, 162, 162A formed along the first side margin and upper, lower and intermediate openings 164, 166, 166A formed along the second side margin to form the first and second interlocking connections 122, it will be understood that other embodiments can use other arrangements of locking tabs and mating openings to form the connections. For example, other numbers of locking tabs and mating openings can be used to form each interlocking connection and/or the edge margins of the blank may be formed with different arrangements of tabs and openings without departing from the scope of the invention.

The tabs 160, 162, 162A are configured to be selectively and repeatably pushed into and removed from the openings 164, 166, 166A (e.g., at least about 25 times) without materially damaging the blanks 120 to an extent that they are no longer suitable for reuse. Each tab 160, 162, 162A is hingedly connected to the wall blank 120. Each tab 160, 162, 162A in the illustrated embodiment is formed by a generally three-sided cutout and is closely similar in construction and function to the tabs 161, 163 described in more detail below. In the illustrated embodiment, each tab 160, 162, 162A is formed as one piece of material with the wall blank 120.

The openings 164, 166, 166A in the illustrated embodiment are generally rectangular shape and have a height and a width. The width of the openings 164, 166, 166A are narrower than the portions of the tabs 160, 162, 162A received in the openings so that the interlocking portions push through the openings lockingly engage adjacent portions of the second side panel 52. The heights of the openings 164, 166, 166A are longer than the respective tabs 160, 162, 162A to provide space for grasping and manipulating the tabs when they are inserted through the openings.

Referring again to FIG. 1, the perimeter wall assembly 114 and the bottom tray 112 define interlocking formations configured to form an interlocking connection, generally indicated at 123, that in the erected configuration secure the perimeter wall assembly and the bottom tray together. The interlocking formations secure a bottom edge margin of the perimeter wall assembly 114 in a nested position within the rim 132 of the bottom tray 112. Broadly, the bottom edge margin of the perimeter wall assembly 114 and the rim 132 may be said to “overlap” in the assembled bulk bin. In the illustrated embodiment, the interlocking connection 123 includes first and second interlocking connections 123L, 123R. The first and second interlocking connections 123L, 123R are generally identical (e.g., mirror images of each other). The first interlocking connection 123L secures the left wall panel 120L to the bottom tray 112 and the second interlocking connection 123R secures the right wall panel 120R to the bottom tray. There are four interlocking connections 123L, 123R in total, but only two may be seen in FIG. 1.

The interlocking formations comprise at least one locking tab and at least one opening for a corresponding locking tab. Each locking tab extends through a corresponding opening to secure and lock the bottom tray 112 and the perimeter wall assembly 114 together. The locking tabs and openings can be a part of (e.g., formed in) either the bottom tray 112 or the perimeter wall assembly 114 (e.g., the left and right wall panels 120L, 120R). For example, in one embodiment the locking tabs extend from the bottom tray and the openings are formed in the perimeter wall assembly 114, in another embodiment the locking tabs extend from the perimeter wall assembly and the openings are formed in the bottom tray, and in still another embodiment the bottom tray and perimeter wall each include a mix of locking tabs and openings. In the illustrated embodiment, the locking tabs extend from the bottom tray 112 and the openings are formed in the perimeter wall assembly 114. The bottom tray 112 includes left and right locking tabs 161 and front and back locking tabs 163. The left and right locking tabs 161 are formed in the respective left and right rim panels 132L, 132R of the bottom tray 112 and the front and back locking tabs 163 are formed in the respective front and back rim panels 132F, 132B (see, FIG. 4). The perimeter wall assembly 114 defines left and right openings 165 that are generally aligned with the respective left and right locking tabs 161 and defines front and back openings 167 that are generally aligned with the respective front and back locking tabs 163. As may be seen in FIG. 3, the center panel 150 of the wall blank 120 defines the left and right openings 165 and the first and second end panels 151, 152 define the front and back openings 167.

The openings 165, 167 are located adjacent to the bottom edge margin of the perimeter wall assembly 114. The locking tabs 161, 163 are located on the rim 132 of the bottom tray 112 and are each opposed by one (broadly, at least one) opening 165, 167 when the perimeter wall assembly 114 is attached to the bottom tray. When the bulk bin 110 is erected as shown in FIG. 1, the locking tabs 161, 163 of the bottom tray 112 are configured to be lockingly pushed through (e.g., inserted into) the openings 165, 167 of the perimeter wall assembly 114 (e.g., the left and right wall members 120L, 120R) to form the interlocking connection 123 (e.g., the first and second interlocking connections 123R, 123L) between the bottom tray and the perimeter wall assembly. The locking tabs 161, 163 extend through the openings 165, 167 and into the interior 116. The locking tabs 161, 162 extend substantially perpendicular to the perimeter wall assembly 114. In the illustrated embodiment, each locking tab 161, 163 extends through one of the openings 165, 167, although other arrangements are within the scope of the present disclosure. For example, one locking tab 161, 163 (e.g., a front and/or back locking tab) can extend through aligned openings 165, 167 (e.g., a front and/or back opening) in the overlapped portions of the left and right wall members 120L, 120R. In this configuration, the one locking tab 161, 163 secures the left and right wall members 120L, 120R together and to the bottom tray 112 (e.g., this locking tab may replace the lower locking tab 162).

The locking tabs 161, 163 are connected to the rim 132. Preferably, each side of the rim 132 (e.g., rim panels 132L, 132R, 132F, 132B) include at least one locking tab 161, 163 and each side of the perimeter wall assembly 114 includes at least one opening 165, 167 to secure each side of the perimeter wall assembly and each side of the bottom tray 112 together. In the illustrated embodiment, each side of the rim 132 includes two locking tabs 161, 163 and each side of the perimeter wall assembly 114 includes two openings 165, 167, although side with more or fewer openings/locking tabs are within the scope of the present disclosure.

Figure 5:
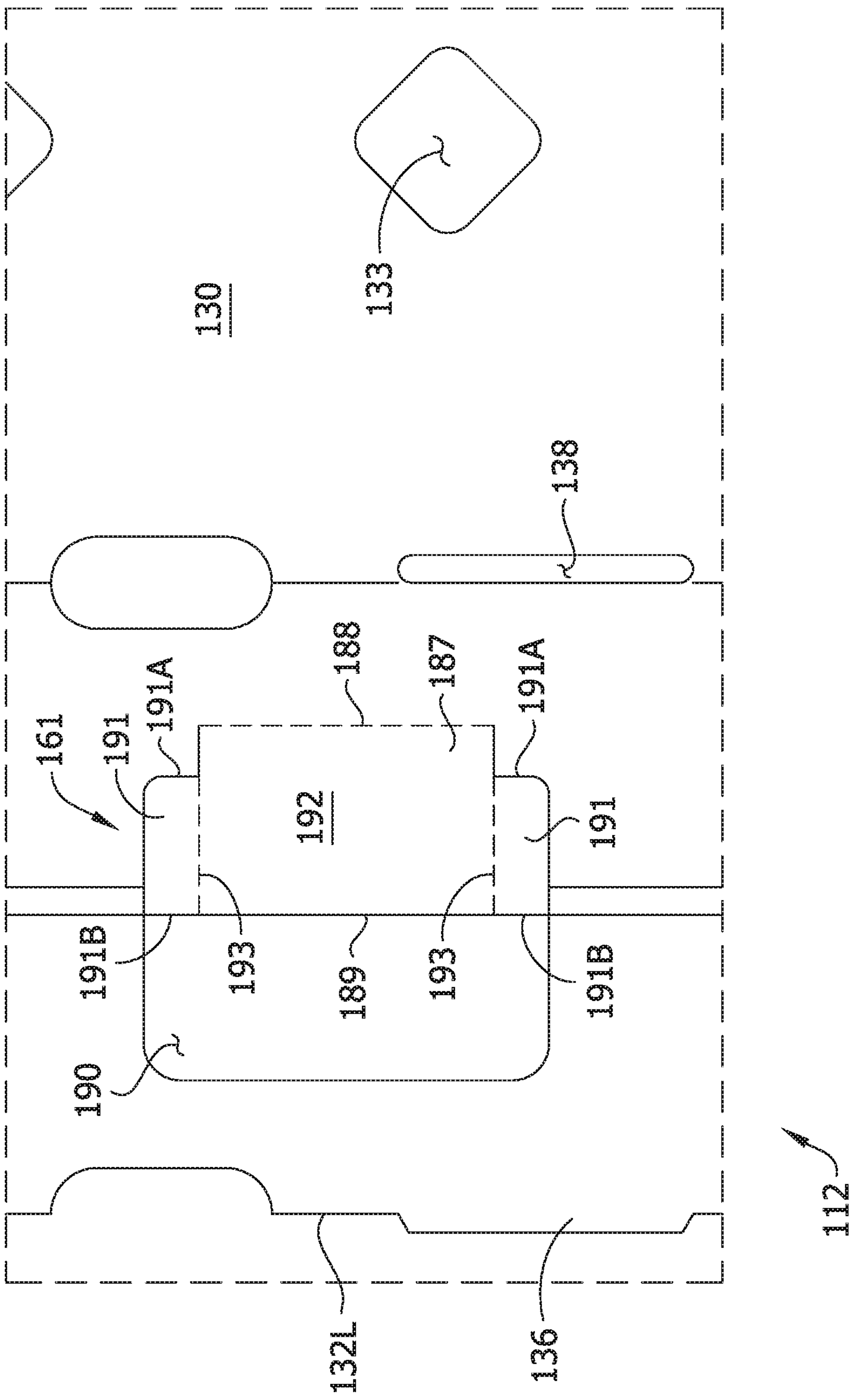
FIG. 5 is an enlarged, fragmentary view of a portion of FIG. 4 illustrating a left side locking tab of the bottom tray.
Figure 6:
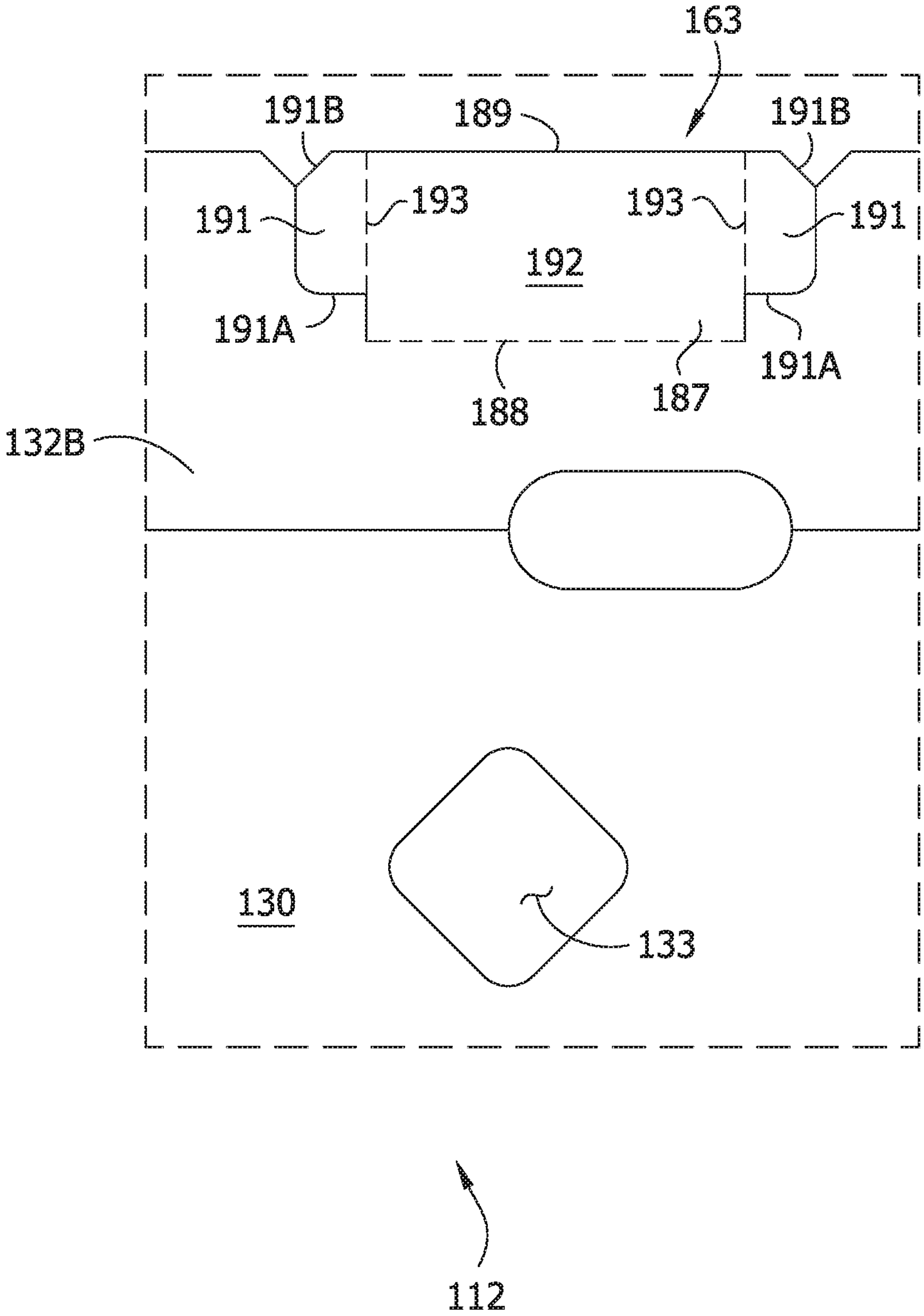
FIG. 6 is an enlarged, fragmentary view of a portion of FIG. 4 illustrating a back locking tab of the bottom tray.

Referring to FIGS. 4-6, each tab 161, 163 in the illustrated embodiment is formed by a generally three-sided cutout in the rim 132 of the bottom tray 112 defining a narrow neck portion 187 adjacent a fold joint 188 and a wider interlocking portion 189 toward the free end of the tab. The fold joint 188 of each of the tabs 160, 163 is formed along the bottom end of the tab. FIG. 5 shows that, because of the way in which the rim panels 132R, 132L are formed, an opening 190 is contiguous with and just outward from the tab 161. The opening 190 is sized so that after the rim panels 132R, 132L are folded over on themselves to form the right and left sides of the rim 132, the tabs 161 are free to move through the opening without any obstruction. As shown herein, each tab 161, 163 is formed as one piece of material with the wall blank 20.

The openings 165, 167 in the illustrated embodiment are generally rectangular shape and have a height and a width. The width of the openings 165, 167 are narrower than the respective interlocking portions 189 of the tabs 161, 163 so that the interlocking portions push through the openings lockingly engage adjacent portions of the perimeter wall assembly 114. The heights of the openings 165, 167 are greater than the respective tabs 161, 163 to provide space for grasping and manipulating the tabs when they are inserted through the openings.

The interlocking portion 189 of each tab 161, 163 includes wing portions 191 that extend outward from a spine portion 192 generally aligned with the neck portion 187. The wing portions 191 define a width of the tab 161, 163 that is wider than the width of the corresponding opening 165, 167. Accordingly, the wing portions 191 must be deformed or bent to pass through the openings 165, 167. In one or more embodiments, as described in U.S. Pat. No. 9,290,290, which is hereby incorporated by reference in its entirety, the fluted plastic material of the blank 120 is oriented so that the flutes extend generally parallel to the spine portions 192 to define resilient living hinges along fold lines 193 between the spine portions and the wing portions 191. When the tabs 161, 163 are pushed through the openings 165, 167, an exterior surface of the perimeter wall assembly 114 engages the wings 191 and bends the wings along the fold lines 193 to fit the through the openings. After being inserted through the openings 165, 167, the tabs 161, 163 are configured to resiliently return toward their original configuration (e.g., by unbending along the fold lines 193 to a configuration in which the wing portions 191 are substantially planar with the neck portion 187) to lockingly engage an interior surface of the perimeter wall assembly 114 adjacent the openings. As may be seen in FIG. 1, the tabs 161, 163 can extend substantially perpendicular to the perimeter wall assembly 114 in the erected position. In this configuration, inner ends 191A (FIGS. 5 and 6) of the wing portions 191 lockingly engage the perimeter wall assembly 114 adjacent the opening 165, 167 in which the tab is received to prevent the tabs 161, 163 from being withdrawn back through the opening 165, 167.

The inner ends 191A of the wing portions 191 suitably define tapered inner corners (e.g., corners that are radiused, beveled, etc.) and outer ends 191B of the wing portions likewise may define tapered or chamfered outer corners. The tapered outer corners help facilitate inserting the tabs 161, 163 through the respective holes 165, 167 during deployment by gradually bending the wing portions 91 away from their planar orientation as the tabs pass through the holes to form the interlocking connections 123. Likewise, the tapered inner corners help facilitate removing the tabs by gradually bending the wing portions 191 away from their planar orientation as the tabs pass through the holes 165, 167 to disconnect or separate the interlocking connections 123 between bottom tray 112 and the perimeter wall assembly 114.

The sleeve pack 110 can be formed in a suitable manner, such as by stamping, cutting, deforming, punching, etc.

Having described the components of the bulk bin sleeve pack 110, deployment and storage of the bulk bin will now be described in greater detail. In general, it can be seen that the sleeve pack 110 comprises several separate components configured for selective deployment as a bulk bin. To erect the sleeve pack, the bottom tray 112 and the top tray 118 are assembled from the respective blanks. In addition, the left wall member 120L and the right wall member 120R are folded along the fold lines 154 to the U-shaped configurations shown in FIG. 2. In this configuration, the left wall member 210L is arranged so that its central panel 150 forms the left end of the bulk bin 110, its first side panel 151 forms a portion of the back side of the bulk bin, and its second side panel 152 forms a portion of the front side of the bulk bin. The right wall member 120R is similarly arranged so that its central panel 150 forms the right end of the bulk bin 110, its first side panel 151 forms a portion of a front side of the bulk bin, and its second side panel 152 forms a portion of the back side of the bulk bin.

To assemble the perimeter wall assembly 114, the left and right wall members 120L, 120R are positioned in heightwise alignment and so that the first side margin of the left wall member is arranged in overlapping engagement with the second side margin of the right wall member along the back side of the bulk bin and the second side margin of the left wall member is arranged in overlapping engagement with the first side margin of the right wall member along the front side of the bulk bin. In this position, the locking tabs 160, 162, 162A of left wall member 120L are generally aligned with the openings 164, 166, 166A of the right wall member 120R at the back side of the bulk bin 110 and the locking tabs of the right wall member are generally aligned with the openings of the left wall member at the front side of the bulk bin. To establish front and back interlocking connections 122, each pair of tabs 160, 162, 162A is pushed through the aligned openings 164, 166, 166A of the other panel 120L, 120R. As the tabs 160, 162, 162A are inserted, portions of the tabs resiliently bend away from their planar configurations to fit through the openings 164, 166, 166A. And when the tabs 160, 162, 162A are fully inserted, the bent portions resiliently return toward the planar configuration and lockingly engage portions of the respective second side panel 152 adjacent the mating opening 164, 166, 166A. At each interlocking connection, the tabs 160, 162, 162A are suitably bent along fold lines to be oriented substantially perpendicular to the overlapping side margins of the wall members 120A, 120R. The perpendicular tab orientation is thought to provide maximum resistance to inadvertent disengagement of the interlocking connections.

Before or after the perimeter wall assembly 14 is fully assembled, the left and right wall members 120L, 120R can be arranged so that the bottom edge margins thereof are nested with the rim 132 of the bottom tray 112. The openings 165 in the left and right bottom edge margins of the perimeter wall assembly 114 are generally aligned with the tabs 161, and the openings 167 in the front and back bottom edge margins are generally aligned with the tabs 161. The tabs 161, 163 can be folded into the perimeter wall assembly 114 so that the wings 191 are deformed to allow portions of the spines 192 and the wings to pass through the openings 165, 167. Once the wings 191 are fully on the interior of the perimeter wall assembly 114, they spring back toward their positions generally parallel with the spines 192. Thereafter, forces tending to separate the bottom tray 112 from the perimeter wall assembly 114 are resisted by engagement of the edges 191A with the interior surface of the perimeter wall assembly.

In use, the interior 116 of the bulk bin 110 is loaded with goods. Because the bulk bin 110 is made of fluted plastic boards that are formed to include fluid flow holes 133, 143, 149 the bulk bin is well-suited for receiving moist or damp goods such as produce. If desired, when the interior 116 of the bulk bin 110 is filled, the top tray 118 can be placed as a covering over the open top end of the bin. In this configuration, the top edge margin of the perimeter wall assembly 114 is nested in the rim 142 of the top tray. The tabs 161, 163 provide a good connection between the bottom tray 112 and the perimeter wall assembly 114 to resist separation in use. For example, if the bulk bin 110 loaded with produce is drenched with water and ice (as often occurs in use), the uplift caused by the water and ice on the perimeter wall assembly 114 is resisted by the tabs 161, 163 so that the perimeter wall assembly remains connected to the bottom tray 112. The bulk bin 110 is also constructed to be repeatedly assembled and disassembled for use and storage.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A bulk bin sleeve pack for being repeatably erected to form a bulk bin having a bottom wall and a perimeter wall and collapsed when not in use, the bulk bin sleeve pack comprising:

a base configured to form the bottom wall of the bulk bin, the base including a rim;

a first wall member configured to form a portion of the perimeter wall of the bulk bin, the first wall member having a bottom edge margin, a top edge margin, and first and second side margins, the bottom edge margin configured for attachment to the base so that the first wall member overlaps at least a portion of the base;

a second wall member configured to form another portion of the perimeter wall of the bulk bin, the second wall member having a bottom edge margin, a top edge margin, and first and second side margins, the bottom edge margin of the second wall member being configured for attachment to the base so that the first side margin of the first wall member overlaps the second side margin of the second wall member, the second side margin of the first wall member overlaps the first side margin of the second wall member, and the second wall member overlaps at least a portion of the base;

the first and second wall members configured for attachment to the base so that the first and second wall members overlap the rim;

locking tabs formed as one piece with the base;

locking openings associated with the first and second wall members, the locking openings opposing the locking tabs when the first and second wall members are attached to the base to form the perimeter wall of the bulk bin;

the locking tabs being configured to be lockingly inserted into the locking openings to secure the first and second wall members to the base to form the bulk bin, and to be nondestructively removed from the locking openings to permit separation of the first and second wall members from the base;

wherein the rim includes a plurality of sides, each side of the rim including at least one locking tab of the locking tabs, each locking tab having a secured end attached to the base and a free end above the secured end, the free end of the locking tab being disposed to form a portion of an upper edge of the rim.

2. The bulk bin sleeve pack as set forth in claim 1, wherein the locking tabs are configured to be repeatedly inserted into and withdrawn from the locking openings to erect and collapse the bulk bin.

3. The bulk bin sleeve pack as set forth in claim 1, wherein each of the locking tabs comprising a spine portion and a pair of wing portions connected to the spine portion at a free end thereof, the spine portion having a width less than a width of the locking openings and the locking tab at the free end having a width greater than the locking openings.

4. The bulk bin sleeve pack as set forth in claim 1, wherein the locking tabs are connected to the base for folding about a generally horizontal fold line.

5. The bulk bin sleeve pack as set forth in claim 1, wherein each of the locking tabs are hingedly connected to the base.

6. The bulk bin sleeve pack as set forth in claim 1, wherein the base, the first wall member and the second wall member are each formed from a single board.

7. The bulk bin sleeve pack as set forth in claim 6, wherein each of the boards comprises fluted plastic.

8. The bulk bin sleeve pack as set forth in claim 1, wherein each of the locking tabs comprising a spine portion and a pair of wing portions connected to the spine portion at a free end thereof, the spine portion having a width less than a width of the locking openings and the locking tab at the free end having a width greater than the locking openings.

9. The bulk bin sleeve pack as set forth in claim 1, wherein the first and second wall members are sized to be received in the base in a collapsed configuration of the bulk bin sleeve pack.

10. A bulk bin comprising:

a base having a perimeter and including a rim;

a perimeter wall extending circumferentially around a bulk bin interior and having a top edge margin and an opposite bottom edge margin arranged adjacent the perimeter of the base such that the base defines a bottom end of the bulk bin interior;

the perimeter wall being configured for attachment to the base so that the first and second wall members overlap the rim;

an interlocking connection securing the base and the perimeter wall together, the interlocking connection including a plurality of openings formed in the perimeter wall and a plurality of locking tabs formed as one piece with and extending from the base each locking tab extending through a respective one of the plurality of openings and locking the base and perimeter wall together;

the rim further including a plurality of sides, each side of the rim including at least one locking tab of the plurality locking tabs, each locking tab having a secured end attached to the base and a free end above the secured end, the free end of the locking tab being disposed to form a portion of an upper edge of the rim when no received in one of the plurality of openings;

the locking tabs being arranged to be lockingly inserted into the locking openings to secure the perimeter wall to the base to form the bulk bin, and to be nondestructively removed from the locking openings to permit separation of the perimeter wall from the base.

11. The bulk bin as set forth in claim 10, wherein each locking tab extends substantially perpendicular to the perimeter wall when received in one of the openings.

12. The bulk bin as set forth in claim 10, wherein each locking tab extends through one of the openings and into the bulk bin interior to lock the base and perimeter wall together.

13. The bulk bin as set forth in claim 10, wherein the perimeter wall includes a plurality of sides, at least one opening of the plurality of openings being located on each side of the perimeter wall.

14. The bulk bin as set forth in claim 10, wherein the perimeter wall comprises a first wall member having a first side margin and a second side margin and a second wall member having a first side margin and a second side margin, the first side margin of the first wall member attached to the second side margin of the second wall member and the second side margin of the first wall member attached to the first side margin of the second wall member.

* * * * *